Patented Aug. 14, 1934

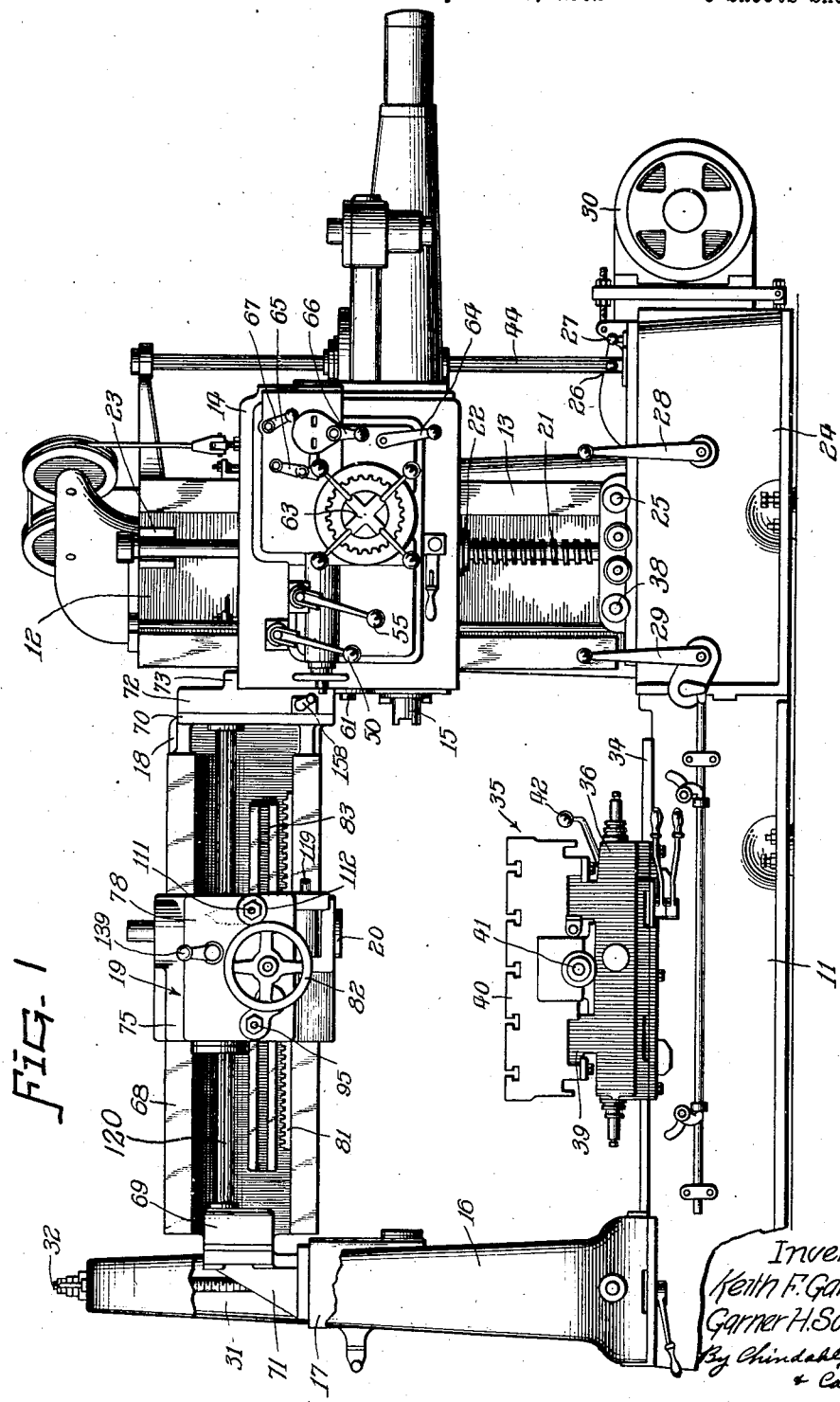

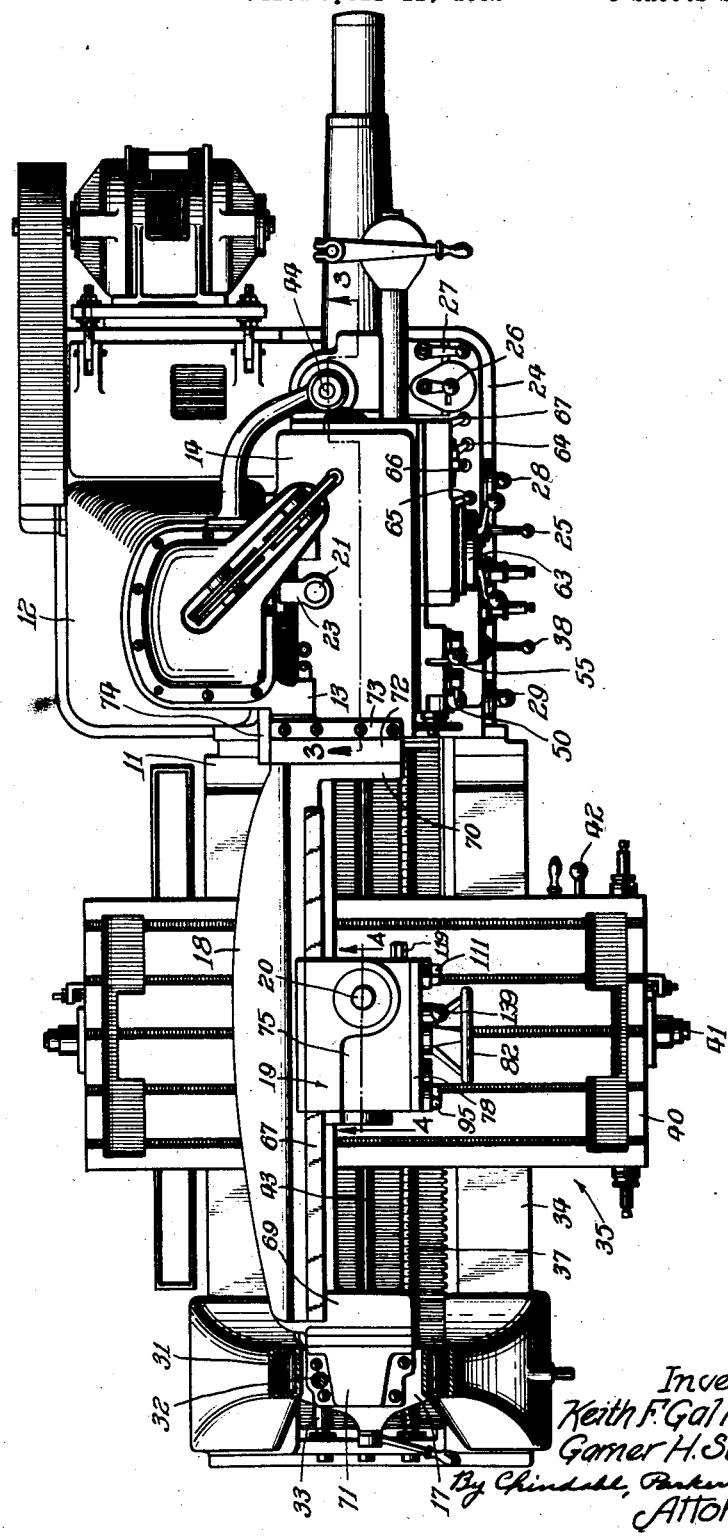

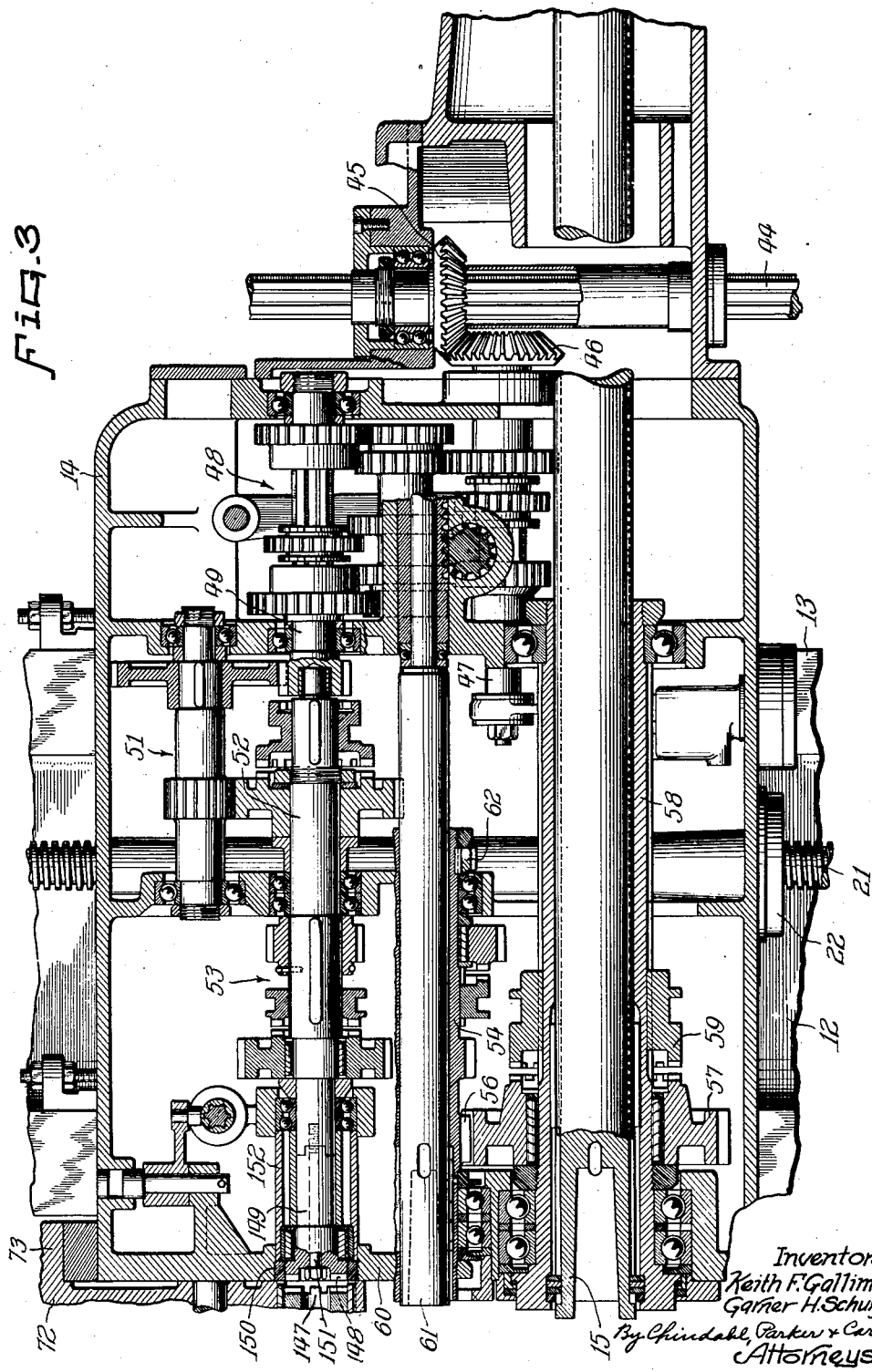

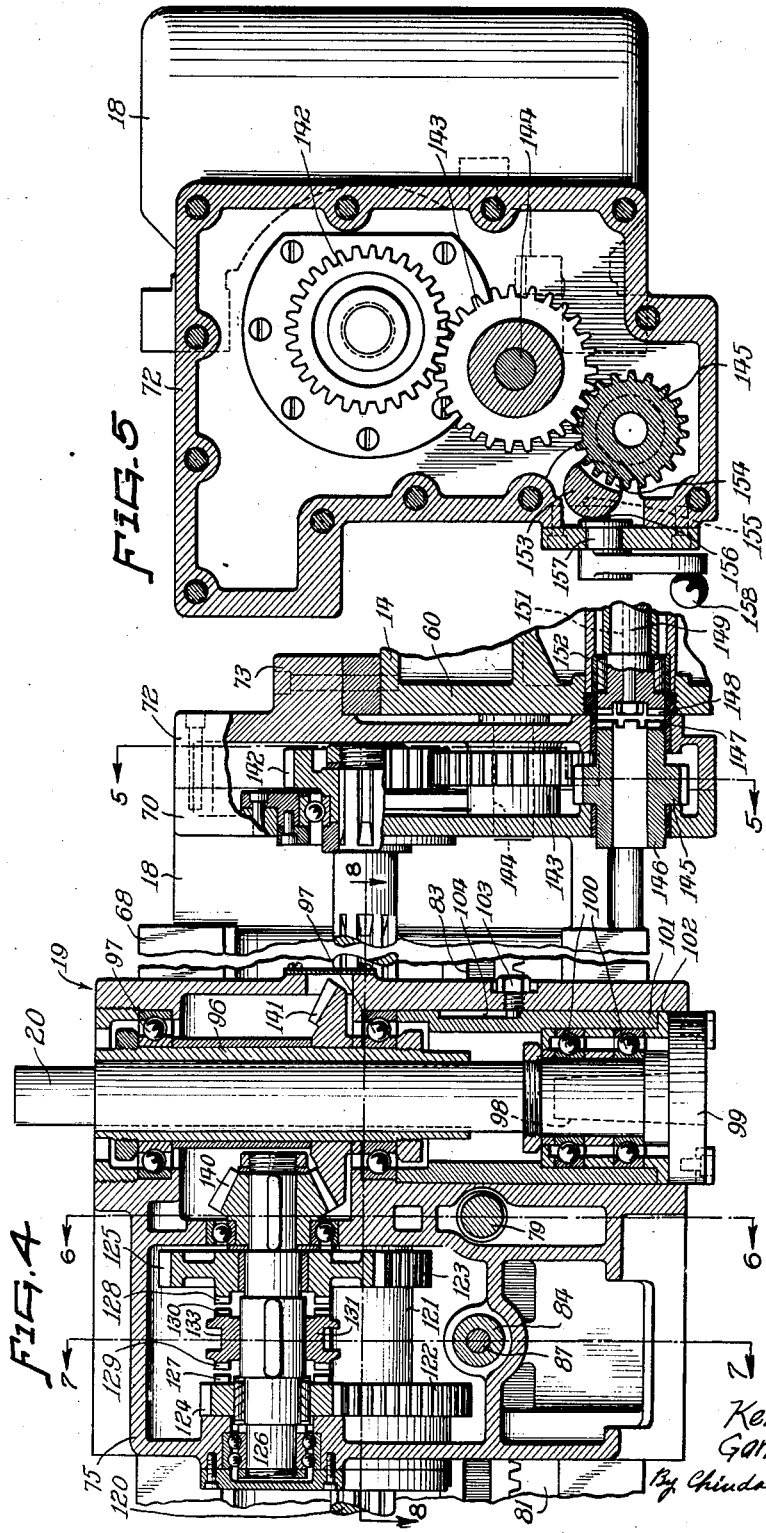

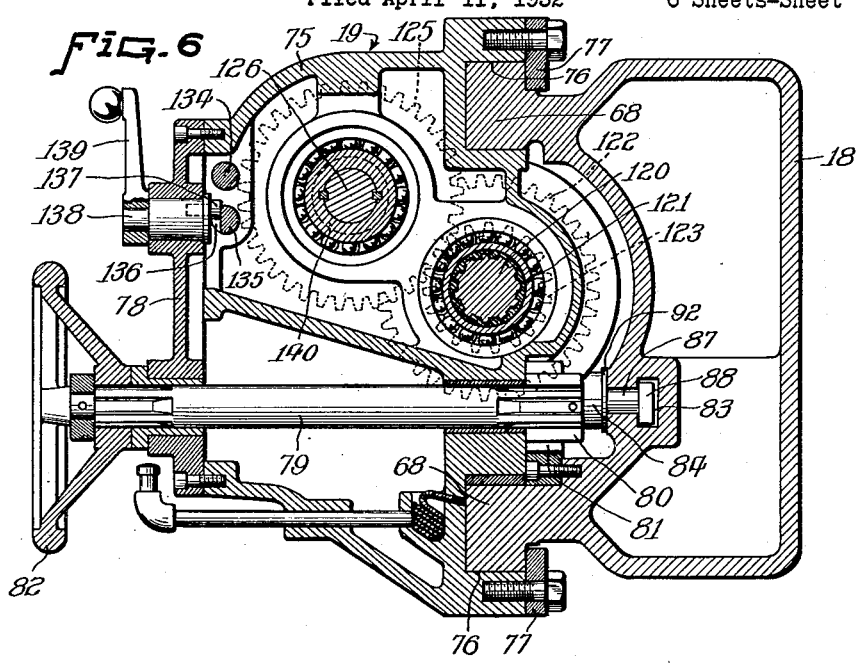
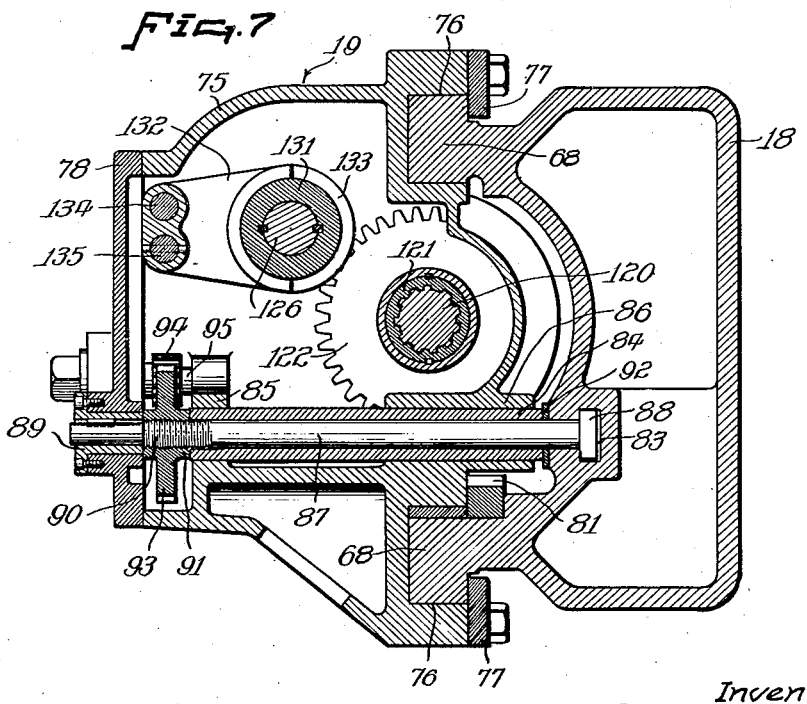

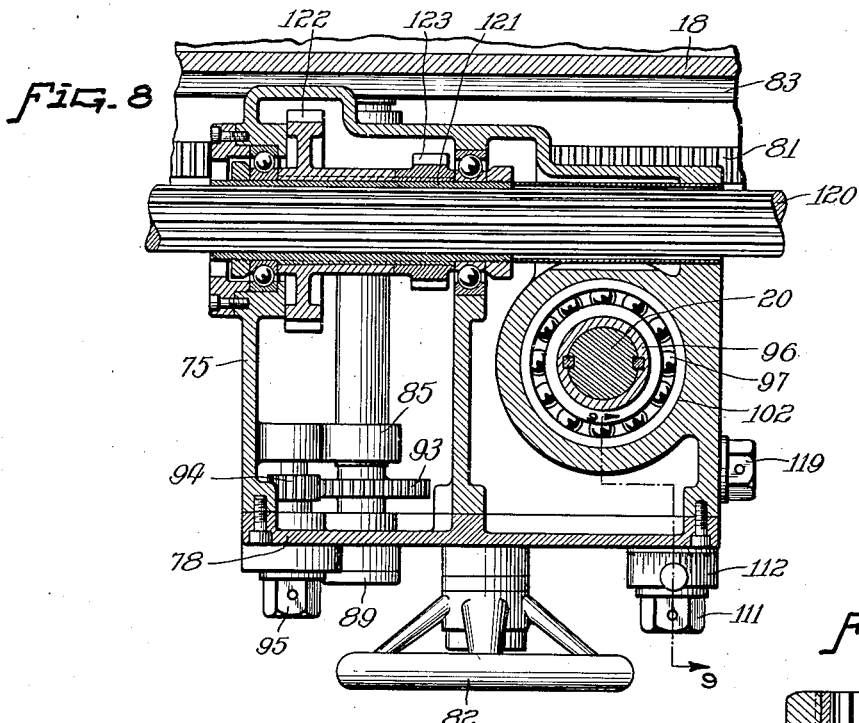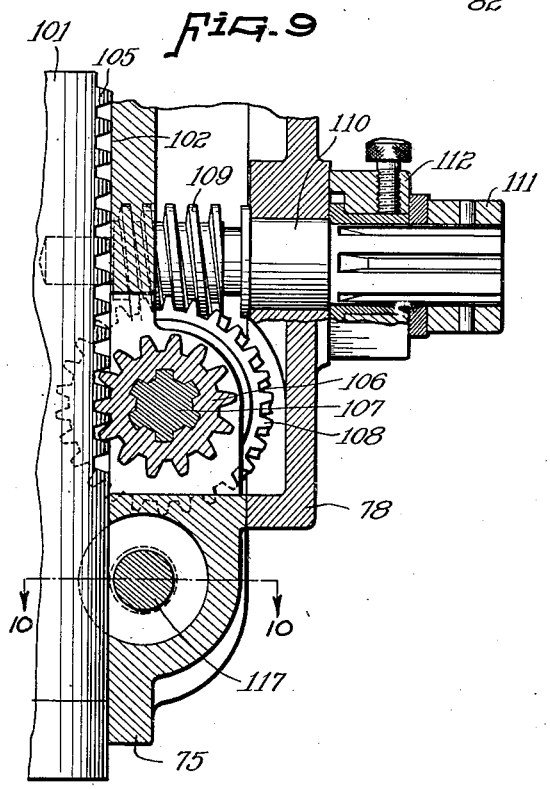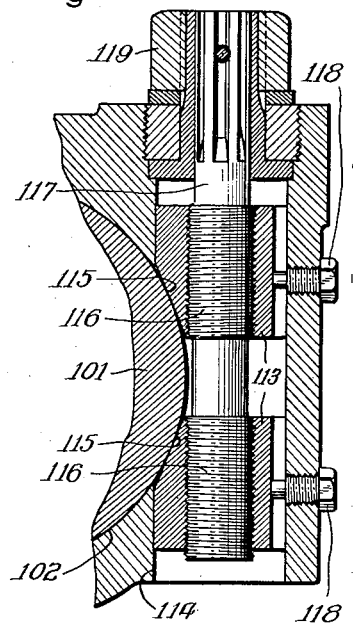

1,969,791

UNITED STATES PATENT OFFICE 1,969,791

HORIZONTAL BORING MACHINE

Keith F. Gallimore and Garner H. Schurger, Fond du Lac, Wis., assignors to Giddings & Lewis Machine Tool Co., Fond du Lac, Wis., a corporation of Wisconsin Application April 11, 1932, Serial No. 604,410

17 Claims. (Cl. 29—26)

The present invention relates to improvements in a machine tool of the type commonly known as a horizontal boring, drilling and milling machine.

Various differing forms of machines of this type comprise in common a horizontal base, a vertical column on the base, a headstock mounted for vertical adjustment on the column, a horizontal axially adjustable spindle in the headstock, and, available for optional use, a vertical end-support column on the base and having an end-support block mounted thereon for vertical adjustment synchronously with the headstock.

One of the primary objects of the present invention is to render horizontal boring, drilling and milling machines more flexible and universal in use.

Another and more specific object resides in the provision of new and improved means comprising a horizontal support spanning the spindle headstock and the end-support block for vertical adjustment therewith, and an auxiliary head mounted on the support for horizontal adjustment thereon, and having a vertical axially adjustable tool spindle and self-contained variable-speed means for driving said spindle.

Another object resides in connecting the vertical spindle drive in the auxiliary head to the spindle drive in the main headstock without interfering with the free use of the horizontal spindle.

A more specific object resides in connecting the drive for the vertical spindle to a countershaft in the drive in the main headstock for the horizontal spindle so as to multiply the variable speeds for the vertical spindle afforded through the self-contained drive in the auxiliary headstock by a plurality of speeds from the drive for the horizontal spindle.

An important object of the invention resides in the provision of the horizontal support and the auxiliary head in the form of an attachment adapted to be removably mounted on the main headstock and the end-support block without altering the general character of the machine or its operation when removed.

Further objects and advantages will become apparent as the description proceeds.

Figure 1 is a front elevational view of a machine embodying the features of our invention.

Fig. 2 is a plan view of the machine.

Fig. 3 is a fragmentary vertical sectional view of the headstock on an enlarged scale taken along line 3—3 of Fig. 2.

Fig. 4 is a fragmentary vertical sectional view of the vertical head on an enlarged scale, partially broken away and taken in the plane of line 4—4 of Fig. 2.

Fig. 5 is a transverse vertical sectional view taken along line 5—5 of Fig. 4.

Fig. 6 is a transverse vertical sectional view taken along line 6—6 of Fig. 4.

Fig. 7 is a transverse vertical sectional view taken along line 7—7 of Fig. 4.

Fig. 8 is a fragmentary horizontal sectional view taken along line 8—8 of Fig. 4.

Fig. 9 is a fragmentary detail vertical sectional view of the spindle axial feed on an enlarged scale taken along line 9—9 of Fig. 8.

Fig. 10 is a fragmentary horizontal sectional view of the spindle clamp taken along line 10—10 of Fig. 9.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the invention in its preferred embodiment is adapted to a horizontal boring, drilling and milling machine (see Figs. 1 to 3). Machines of this type are commonly provided in various forms. Generally, they comprise a horizontal base 11, a vertical column 12 mounted on the base 11 and formed with parallel vertical ways 13 on the front, a spindle headstock 14 slidably disposed on the ways 13 for vertical adjustment, a horizontal tool spindle 15 mounted in the headstock 14 for rotation and for axial adjustment transversely of the ways 13, an end-support column 16 mounted on the base 11, and an end-support block 17 mounted on the column 16 for vertical adjustment into axial alinement with the spindle 15.

Broadly, the invention comprises an elongated support 18 removably secured at its ends respectively to the headstock 14 and the end-support block 17 for vertical adjustment therewith as a unit, and an auxiliary head 19 mounted on the support 18 for horizontal adjustment between the columns 12 and 16 and having a vertical spindle 20.

Preferably, the horizontal boring, drilling and milling machine is of the form disclosed in detail in a patent to Keith F. Gallimore, No. 1,858,491, issued May 17, 1932. Thus, the headstock 14 is supported by a vertical feed screw 21 which extends therethrough and is in threaded engagement with a fixed nut 22 therein. Of the feed screw 21, the upper end is rotatably anchored against endwise movement in a bearing bracket 23 on the column 12, and the lower end extends into a feed box 24 forming part of the base 11 wherein it is connected through a reversing mechanism (not shown) under the control of a hand actuator 25 to a power feed drive (not shown). The power drive comprises a multiple-feed device adjustable by means of hand actuators 26 and 27, and a rapid-traverse device, said devices being selectively available under the control of a hand actuator 28. The power feed drive is adapted to be connected through a clutch (not shown) operable by a hand actuator 29 to a suitable source of power, such as an electric motor 30 mounted on the right end of the base 11.

In the present instance, the machine base 11 is narrow and elongated, and the two columns 12 and 16 are mounted on opposite ends thereof. Hence, the support 18 overlies and is parallel to the base 11. Preferably, the end-support column 16 is formed with two parallel spaced vertical standards 31 which are integrally joined at their upper and lower ends, and between which the block 17 is slidably disposed. The block 17 is supported for synchronous adjustment with the headstock 14 by a vertical feed screw 32 which is rotatably anchored at its upper end in the column 16 against endwise movement, and which is connected at its lower end through a shaft 33 extending longitudinally within the base 11 to the feed screw 21 in the feed box 24.

In the present instance, the base 11 is provided on the top with parallel longitudinal ways 34 for adjustably supporting a carriage 35 adapted to present work to either or both of the spindles 15 and 20. Preferably, the carriage 35 comprises a saddle 36 mounted on the ways 34 and connected to a feed screw 37 for adjustment longitudinally of the base 11. The feed screw 37 extends longitudinally within the base 11, and is connected at one end, through a reversing clutch (not shown) under the control of a manual actuator 38, to the power feed drive within the feed box 24.

The top of the saddle 36 is formed with parallel ways 39 on which a work table 40 is slidably disposed for adjustment transversely of the base 11. A feed screw 41 anchored against endwise movement in the table 40 constitutes means for adjusting the table 40, and is connected for all positions of the saddle through a reversing clutch (not shown) under the control of a manual actuator 42 to a spline shaft 43 extending longitudinally within the base 11 to the feed box 24.

By reason of the separate reversing clutches respectively between the power feed drive and the feed screws 21 (also 32), 37 and 41, the headstock 14, alone or with the end-support block 17, the saddle 36 and the table 40 can be driven selectively and independently in any direction.

The drive for the main spindle 15 is taken from a vertical spline shaft 44 which extends through the headstock 14 for all positions of the latter, and the lower end of which extends to the base 11 for connection to the motor through a reversing clutch (not shown) under the control of the hand actuator 29. In the present instance, a bevel gear 45 (see Fig. 3) axially splined to the shaft 44 meshes with a gear 46 on a shaft 47 connected through an adjustable nine-speed mechanism 48 to a shaft 49. A hand actuator 50 is provided for adjusting the mechanism selectively into any one of its available settings. The outlet shaft 49 is connected through an adjustable two-speed mechanism 51 to a back gear shaft 52 in turn connected through a second adjustable two-speed mechanism 53 to a parallel tubular shaft or sleeve 54 journaled in the headstock 14. A hand actuator 55 is provided for selectively adjusting the mechanisms 51 and 53. The sleeve 54 has a pinion 56 meshing with a gear 57 rotatable on a parallel sleeve 58 and adapted to be connected thereto by a clutch 59. The sleeve 58 is journaled in the headstock 14 and opens through the left-end wall 60 thereof. The main spindle 15 is slidably splined in the sleeve 58, and extends outside of the wall 60 for attachment of a suitable tool or milling cutter. Thus, the spindle 15 may be rotated in either direction at any one of thirty-six different speeds.

Axially splined in the sleeve 54 is an auxiliary spindle 61 of which one end extends through the wall 60 for attachment of a suitable tool or milling cutter. Both spindles 15 and 61 extend inwardly from their respective drive sleeves 58 and 54 for selective connection to an axial feed drive (not shown) which is connected through a gear 62 to the sleeve 54, connection of which to the spindles is under the control of a master clutch 63 and a selector actuator 64, which has a plurality of available speed adjustments under the control of two actuators 65 and 66, and which is reversible under the control of an actuator 67.

A full disclosure herein of the details of various parts referred to as "not shown" is deemed unnecessary since such details per se form no part of the present invention, and since they are fully disclosed in the aforesaid patent.

The support 18 is in the form of an elongated rail having two parallel, vertically spaced, longitudinal ways 68, preferably rectangular in form, projecting forwardly from its front side. Two forwardly projecting flanges or arms 69 and 70 are formed respectively on opposite ends of the rail 18 for attachment to the end-support block 17 and the headstock 14. In the present instance, the arm 69 is removably bolted to an angle bracket 71 removably bolted onto the top of the end-support block 17. The arm 70 is in the form of a plate constituting one wall or section of a housing 72, the other or complementary section of the housing being securely bolted thereto. The housing 72 is positioned against the end wall 60, and is removably secured to the headstock 14 as by means of a flange 73 and a side bracket 74 bolted respectively to the top and rear of the headstock. By reason of the forwardly projecting arms 69 and 70, the rail 18 is displaced rearwardly so that the vertical spindle 20 in the auxiliary head is conveniently located in the vertical axial plane of the spindles 15 and 61.

The auxiliary head has a casing 75 formed with suitable ways 76 slidably secured to the ways 68 as by means of gib plates 77. The front of the casing 75 is closed by a cover plate 78. Journaled in and extending through the casing 75 is a shaft 79 (see Fig. 6). A pinion 80 fixed on the rear end of the shaft 79 meshes with a gear rack 81 secured on the rail 18 along and inside of the lower way 68. The front end of the shaft 79 is provided with a hand wheel 82 whereby the head 19 may be adjusted longitudinally of the rail 18 between the headstock 14 and the end-support block 17.

To provide means for clamping the head 19 in position of adjustment, the rail 18 is formed with a longitudinal T-slot 83. An elongated sleeve 84 (Figs. 7 and 8) extends slidably through a bearing web 85 inside the casing 75 and a bearing sleeve 86 in the rear wall of the casing for end abutment at its rear end against the rail 18. Extending through the sleeve 84 is a draw bolt 87 which has a head 88 on its rear end slidably disposed in the T-slot 83, and which at its front end is slidably keyed against rotation in a flanged sleeve 89 secured in the cover plates 78. The bolt 87 has a screw-threaded portion 90, between the web 85 and the cover plate 78, on which a nut 91 is threaded in end abutting engagement with the sleeves 84 and 89. Preferably a washer 92 is disposed on the bolt 87 against the outer end of the clamp sleeve 84.

The nut 91 is formed integral with a gear 93 which meshes with a pinion 94 on a stub shaft 95 journaled in and projecting through the cover plate 78. The front end of the shaft is hexagonal in form for the reception of a suitable wrench (not shown). It will be evident that upon turning the nut 91 to draw the bolt forwardly, the marginal flanges of the T-slot 83 will be tightly clamped between the rear outer end of the sleeve 84 and the bolt head 88.

The vertical spindle 20 extends through and is slidably keyed in a drive sleeve 96 (see Fig. 4) journaled at opposite ends in ball bearings 97, and at its lower end is formed with a taper socket 98 for the mounting of a tool or milling cutter 99. The lower end of the spindle 20 also is rotatably anchored against relative endwise movement in ball bearings 100 in the lower end of a ram sleeve 101 slidably disposed in a bore 102 opening upwardly into the underside of the head 19. A pin 103 threaded through the wall of the bore 102 engages in a longitudinal groove 104 formed in the exterior of the sleeve 101 to hold the latter against rotation. Formed in the front of the sleeve 101 is a longitudinal gear rack 105 (see Fig. 9) with which meshes a pinion 106 on a shaft 107 journaled in the front of the casing 75. A worm wheel 108 on the shaft 107 meshes with a worm 109 on a shaft 110 journaled in the cover plates 78. Secured to the outer end of the shaft 110 are a hexagonal collar 111 for the reception of a tool (not shown) for adjusting the spindle 20 axially in the head 19, and an adjustable micrometer dial 112 for indicating the extent of such adjustment.

The spindle 20 is adapted to be clamped in position of axial adjustment by means of two spaced clamp blocks 113 (see Figs. 9 and 10) slidably disposed in a bore 114 transversely intersecting the front of the bore 102, and having oppositely inclined faces 115 for engaging opposite sides of the sleeve 101. The blocks 113 are adjustably threaded onto lead screws 116 of opposite lead rigid with a shaft 117, and are longitudinally splined against rotation by means of screw pins 118. One end of the shaft 117 is rotatably anchored against endwise movement, and has a collar 119 adapted for engagement by a tool (not shown).

The rotative drive for the spindle 20 comprises a suitable multiple speed mechanism (see Figs. 4 to 8) in the casing 75 connected to a power inlet shaft 120. This shaft extends longitudinally of the support 18 and through the casing 75 wherein it is axially splined to a rotatable sleeve 121.

Secured to the sleeve 121 are two gears 122 and 123 which mesh respectively with two gears 124 and 125 rotatably mounted on a shaft 126 parallel to the shaft 120. The adjacent faces of the gears 124 and 125 are provided with clutch elements 127 and 128 adapted for selective engagement respectively by opposite end clutch elements 129 and 130 on a clutch sleeve 131 splined for axial movement on the shaft 126. The means for shifting the sleeve 131 comprises a shifter shoe 132 which engages in an annular groove 133 in the sleeve, and which is slidable on a fixed rod 134 in the casing 75. Secured to the shoe 132 is a shifter rod 135 which is formed with a transverse notch 136 engaging an eccentric pin 137 on a rock shaft 138 journaled in the cover plate 78. A hand lever 139 is secured to the outer end of the shaft 138, and affords means whereby the clutch sleeve 131 may be adjusted into neutral or into either end position to select either one of two speeds in the drive for the spindle 20. Secured to one end of the shaft 126 is a bevel gear 140 which meshes with a bevel gear 141 secured to the spindle drive sleeve 96.

The shaft 120 is journaled at its ends against endwise movement in the arms 69 and 70, and may be connected to any suitable source of power. In the preferred form of the invention, the shaft 120 is adapted to be connected to the back shaft 52 (see Figs. 3 to 5) so as to permit free use of the spindles 15 and 61 and also to utilize the multiple speeds in the drive to the shaft 52 for the spindle 20. To this end, a gear 142 is secured to the right end of the shaft 120 in the housing 72 and is connected through an intermediate gear 143 on a stub shaft 144 to a gear 145 journaled and axially slidable with a hollow shaft 146 in the arm plate 70 and the housing 72. The shaft 146 is formed on one end with clutch elements 147 adapted for movement into engagement with complementary elements 148 of a shaft section 149 journaled in an opening 150 in the wall 60. The shaft section 149 is secured to the adjacent end of the back shaft 53 by means of an axial bolt 151. A sleeve 152 encloses the coupling. To provide means for shifting the shaft 146 to open or close the clutch 147, 148, a shifter rod 153 slidable in the housing 72 has a transverse notch 154 embracing the periphery of the gear 145 and another transverse notch 155 receiving an eccentric pin 156 on a stub shaft 157 in the front wall of the housing. A hand lever 158 is secured on the outer end of the shaft 157.

It will be evident that the head 19 may be adjusted vertically with the headstock 14, and independently horizontally on the rail 18. The spindle 20 also may be adjusted vertically within a limited range without the necessity of adjusting the headstock 14. Use of the spindle 20 does not interfere with the use of horizontal spindles 15 and 61. A total of thirty-six speeds is available in the rotative drive for the spindle 20. The support 18 and the head 19 constitute an attachment which may be removed when desired from the headstock 14 and end-support block 17 in which case the shaft section 149 may be removed and the opening 150 sealed.

We claim as our invention:

1. In a horizontal boring machine, in combination, an elongated horizontal base, a saddle mounted on said base for reciprocation longitudinally thereof, a table mounted on said saddle for reciprocation transversely of said base, a vertical column on one end of said base, a headstock mounted on said column for vertical reciprocation, an auxiliary spindle and a main spindle journaled in parallel relation in said headstock, said main spindle being driven from said auxiliary spindle, said spindles being axially adjustable, a variable-speed power drive in said headstock for said auxiliary spindle, said drive including a back shaft, a vertical column on the end of said base opposite said headstock, an end support mounted for vertical reciprocation on said last mentioned column, an elongated horizontal rail removably mounted at opposite ends respectively on said headstock and said end support for vertical movement therewith, the front of said support being formed with vertically spaced longitudinal ways, a head mounted on said ways, means for adjusting said head longitudinally of said ways, means for securing said head in position of adjustment, a vertical spindle journaled in said head and being axially adjustable, means for adjusting said spindle vertically, a longitudinal drive shaft journaled in the ends of said rail, variable speed means in said head splined to said shaft for driving said vertical spindle, and means including a clutch for connecting one end of said drive shaft to said back shaft.

2. In a horizontal boring machine, in combination, an elongated horizontal base, a vertical column on one end of said base, a headstock mounted on said column for vertical reciprocation, a spindle journaled in said headstock, said spindle being axially adjustable, a variable-speed power drive for said spindle, said drive including a back shaft, a vertical column on the end of said base opposite said headstock, an end support mounted on said last mentioned column for vertical reciprocation, an elongated horizontal support mounted at opposite ends respectively on said headstock and said end support for vertical movement therewith, a head mounted on said support for adjustment longitudinally thereof, a vertical spindle journaled in said head and being axially adjustable, a longitudinal drive shaft journaled in the ends of said support, variable speed means in said head connected to said shaft for driving said vertical spindle, and coupling means for connecting said drive shaft to said back shaft.

3. A vertical spindle attachment for a horizontal boring machine which has a horizontal base, a vertical column on said base, a headstock mounted on said column for vertical reciprocation, a horizontal spindle journaled in said headstock, a variable-speed power drive for said spindle, said drive including a back shaft, a second vertical column on said base, and an end support mounted for vertical reciprocation on said second column, said attachment comprising, in combination, an elongated horizontal support adapted to be removably mounted at opposite ends respectively on said headstock and said end support for vertical adjustment therewith, said support being formed with longitudinal ways, a head adjustably mounted on said ways, a vertical spindle journaled in said head, a longitudinal drive shaft journaled in the ends of said support, variable speed means in said head for connecting said drive shaft to said vertical spindle, and coupling means for removably connecting said drive shaft to said back shaft.

4. In a boring machine, in combination, a horizontal base, two spaced upright columns on said base, a headstock mounted on one column for vertical adjustment, a spindle journaled in said headstock, means including a shaft for driving said spindle, a horizontal support overhanging said base, said support being removably mounted at one end on said headstock and being mounted at the other end for vertical adjustment on the other column, a head mounted on said support for adjustment reversibly from one toward the other of said columns, a vertical spindle journaled in said head, a drive shaft extending longitudinally of said support, variable speed means for connecting said drive shaft to said vertical spindle in any position of adjustment of said head, and means including a separable coupling for connecting said drive shaft to said first mentioned shaft.

5. A vertical spindle attachment for a horizontal boring machine having a horizontal base, two spaced upright columns on said base, a headstock mounted on one column for vertical adjustment, an end-support block mounted on the other column for vertical adjustment with said headstock, and a horizontal spindle journaled in said headstock, said attachment comprising, in combination, a horizontal support adapted to be mounted on said headstock and said block, an auxiliary head mounted on said support for adjustment between said columns, a vertical spindle journaled in said head, a horizontal spline shaft journaled on said support, drive means in said auxiliary head for connecting said spline shaft to said vertical spindle in all positions of said auxiliary head along said support, and separable means for driving said spline shaft in timed relation to said horizontal spindle.

6. A vertical spindle attachment for a horizontal boring machine having a base, two spaced upstanding columns on said base, and a headstock mounted for vertical adjustment on one of said columns, and a horizontal spindle journaled in said headstock, said attachment comprising, in combination, a horizontal support adapted to be mounted on said headstock and the other of said columns and over said base for vertical adjustment, an auxiliary head mounted for movement on said support, and a vertical axially adjustable spindle journaled in said head and being independent of said horizontal spindle, said attachment permitting the normal use of said horizontal spindle.

7. A vertical spindle attachment for a horizontal boring machine having a base, two spaced upstanding columns on said base, and a headstock mounted for vertical adjustment on one of said columns, and a horizontal spindle journaled in said headstock, said attachment comprising, in combination, a horizontal support adapted to be mounted on said headstock and the other of said columns and over said base for vertical adjustment, an auxiliary head mounted for movement on the front of said support, and a vertical axially adjustable spindle journaled in said head, said support being laterally off-set to locate said vertical spindle in the same vertical axial plane as said horizontal spindle, said attachment permitting the normal use of said horizontal spindle.

8. A vertical spindle attachment for a horizontal boring machine having a base, two spaced upstanding columns on said base, and a headstock mounted for vertical adjustment on one of said columns, and a horizontal spindle journaled in said headstock, said attachment comprising, in combination, a horizontal support adapted to be mounted on said headstock and the other of said columns and over said base for vertical adjustment and without interfering with the normal operation of said spindle, an auxiliary head mounted for movement on said support, and a vertical axially adjustable spindle journaled in said head, said support being laterally off-set to locate said vertical spindle in the same vertical axial plane as said horizontal spindle, and means for driving said vertical spindle from said headstock in any position of adjustment of said auxiliary head.

9. In a machine tool, in combination, a supporting member, a headstock on said member, a spindle journaled in said headstock, drive means in said headstock for said spindle, said drive means including a shaft, and an attachment adapted to be mounted on said headstock, said attachment comprising a support, a head adjustably mounted on said support, and a spindle journaled in said head, said last mentioned spindle being disposed in a direction perpendicular to that of said first mentioned spindle, and drive means for said last mentioned spindle, said drive means having a separable connection with said shaft.

10. In a boring machine, in combination, a support, a headstock movable on said support, a horizontal spindle in said headstock, a drive for said tool spindle including a shaft parallel to said spindle and journaled in said headstock, an auxiliary head mounted on said headstock, a vertical tool spindle in said auxiliary head, means for driving said vertical spindle, and separable means for connecting said last mentioned means to said shaft, whereby either or both of said spindles are available for use.

11. In a horizontal boring machine, in combination, a column, a headstock vertically movable on said column, a horizontal spindle journaled in said headstock, a drive for said spindle in said headstock including a shaft parallel to said spindle, a support removably mounted on said headstock for movement therewith, said support being formed with horizontal ways extending longitudinally of said spindle, an auxiliary head adjustably mounted on said ways, a vertical spindle rotatably mounted in said auxiliary head, said vertical spindle being axially adjustable and being disposed in the same vertical axial plane as said first mentioned spindle, drive means for said vertical spindle, and means for removably connecting said drive means to said shaft.

12. In a machine tool, in combination, a supporting member, a headstock movably mounted on said member, a main spindle and an auxiliary spindle journaled in said headstock, said spindles being mounted in parallel relation, a unitary speed change mechanism in said headstock for driving said spindles at a predetermined speed ratio, a support on said headstock, an auxiliary head mounted on said support for adjustment longitudinally of said spindles, a spindle in said auxiliary head extending in a direction perpendicular to said main and auxiliary spindles, and separable means for driving said last mentioned spindle from said speed change mechanism.

13. A vertical spindle attachment for use with two horizontally spaced supports, said attachment comprising, in combination, an elongated horizontal rail adapted to be removably secured respectively to said supports, said rail having two spaced longitudinal ways, and a gear rack and an elongated T-slot extending longitudinally of said ways, a head mounted for adjustment on said ways, means on said head coacting with said rack for adjusting said head, means coacting with said T-slot for securing said head in position of adjustment, a longitudinal spline shaft journaled at its ends in said rail and extending through said head, a vertical axially adjustable spindle journaled in said head, means for adjusting said spindle vertically, means for securing said spindle in any position of axial adjustment, and drive means for said spindle in said head, said drive means including a multiple-speed device and being operatively connected to said spline shaft in all positions of adjustment of said head on said ways.

14. A vertical spindle attachment for use with two horizontally spaced supports and a drive shaft journaled in one of said supports, said attachment comprising, in combination, an elongated horizontal rail having arms on opposite ends adapted to be removably secured respectively to said supports, one of said arms being a gear housing, said rail having spaced longitudinal ways, a head mounted for adjustment on said ways, means for adjusting said head, means for securing said head in position of adjustment, an elongated spline shaft journaled at its ends in said arms and extending through said head, gear means including a clutch in said housing for connecting said spline shaft to said drive shaft, a vertical axially adjustable spindle journaled in said head, means for adjusting said spindle vertically, and drive means for said spindle in said head, said drive means including a multiple-speed device and being operatively connected to said spline shaft in all positions of adjustment of said head on said ways.

15. A vertical spindle attachment for use with two horizontally spaced supports and a drive shaft journaled in one of said supports, said attachment comprising, in combination, an elongated horizontal rail having forwardly projecting arms on opposite ends adapted to be removably secured respectively to said supports, one of said arms being a gear housing, said rail having two vertically spaced longitudinal ways on the front side in offset relation to said arms, and a gear rack and an elongated T-slot extending longitudinally of said ways, a head mounted for adjustment on said ways, means on said head coacting with said rack for adjusting said head, means coacting with said T-slot for securing said head in position of adjustment, an elongated spline shaft journaled at its ends in said arms and extending through said head, gear means including a clutch in said housing for connecting said spline shaft to said drive shaft, a vertical axially adjustable spindle journaled in said head, means for adjusting said spindle vertically, means for securing said spindle in any position of axial adjustment, and drive means for said spindle in said head, said drive means including a multiple-speed device and being operatively connected to said spline shaft in all positions of adjustment of said head on said ways.

16. In a boring machine, in combination, a horizontal base, two spaced upright columns on said base, a headstock mounted on one column for vertical adjustment, a spindle journaled in said headstock, means including a shaft for driving said spindle, a horizontal support overhanging said base, said support being removably mounted at one end on the exterior of said headstock and at the other end for vertical adjustment on the other column, an auxiliary head mounted on said support for adjustment reversibly from one toward the other of said columns, a vertical spindle journaled in said auxiliary head, a spline shaft extending longitudinally of said support and journaled thereon, means for connecting said spline shaft to said vertical spindle in any position in adjustment of said head on said support, and means including a separable coupling for connecting said spline shaft to said first mentioned shaft.

17. In a boring machine, in combination, a support, a headstock movable vertically on said support, a horizontal spindle in said headstock, means for adjusting said spindle axially, a drive for said spindle, said drive including a shaft parallel to said spindle, an auxiliary head supported by said headstock, a vertical spindle in said auxiliary head, means for adjusting said vertical spindle axially, means for driving said vertical spindle, and means for operatively connecting said last mentioned means to said drive, said spindles being selectively available for joint or independent operation, and being independently axially adjustable.

KEITH F. GALLIMORE.
GARNER H. SCHURGER.